US012383070B2

(12) United States Patent
Zaiss et al.

(10) Patent No.: US 12,383,070 B2
(45) Date of Patent: Aug. 12, 2025

(54) DISTRIBUTION PAD FOR A TEMPERATURE CONTROL SYSTEM

(71) Applicant: Sleep Number Corporation, Minneapolis, MN (US)

(72) Inventors: Vit Zaiss, Minneapolis, MN (US); Kody Karschnik, Plymouth, MN (US)

(73) Assignee: Sleep Number Corporation, Minneapolis, MN (US)

( * ) Notice: Subject to any disclaimer, the term of this patent is extended or adjusted under 35 U.S.C. 154(b) by 1043 days.

(21) Appl. No.: 17/368,019

(22) Filed: Jul. 6, 2021

(65) Prior Publication Data

US 2021/0401185 A1 Dec. 30, 2021

Related U.S. Application Data

(63) Continuation of application No. 16/240,351, filed on Jan. 4, 2019, now Pat. No. 11,083,308, which is a (Continued)

(51) Int. Cl.

*A47C 21/04* (2006.01)
*A47C 27/14* (2006.01)
*A61G 7/057* (2006.01)

(52) U.S. Cl.

CPC .......... *A47C 21/044* (2013.01); *A47C 21/048* (2013.01); *A47C 27/14* (2013.01); (Continued)

(58) Field of Classification Search

CPC ...................... A61G 7/05792; A61G 7/05784; A47C 21/04; A47C 21/042; A47C 21/044; A47C 21/048; A47C 27/14; A47C 27/144

(Continued)

(56) References Cited

U.S. PATENT DOCUMENTS 2,596,547 A 5/1952 Winifred
2,601,189 A 6/1952 Wales
(Continued)

FOREIGN PATENT DOCUMENTS

DE 3320771 12/1984
EP 1142515 10/2001
(Continued)

OTHER PUBLICATIONS

U.S. Appl. No. 15/685,912, filed Aug. 24, 2017, Petrovski et al.
(Continued)

*Primary Examiner* — David R Hare
(74) *Attorney, Agent, or Firm* — Fish & Richardson P.C.

(57) ABSTRACT

An air distribution pad comprises an upper layer, a lower layer, and a spacer material located between the upper layer and the lower layer, the spacer material configured to allow air to pass therethrough. An air distributor is configured to distribute air to the spacer material, wherein the air distributor comprises a port configured to receive an air hose, wherein the port is directed laterally sideways from the air distributor. At least one joining structure is coupled to the upper layer and the lower layer, the at least one joining structure providing one or more channels formed through the spacer material in fluid communication with the air distributor. The one or more channels are configured to direct generally laterally flowing air from the port of the air distributor to a generally longitudinal direction along the at least one channel.

20 Claims, 8 Drawing Sheets

Related U.S. Application Data continuation of application No. 14/842,177, filed on Sep. 1, 2015, now Pat. No. 10,194,752, which is a continuation of application No. 13/728,087, filed on Dec. 27, 2012, now Pat. No. 9,131,781.

(52) U.S. Cl.
CPC ...... *A61G 7/05784* (2016.11); *A61G 7/05792* (2016.11); *A47C 21/04* (2013.01)

(58) Field of Classification Search
USPC .............................................................. 5/423
See application file for complete search history.

(56) References Cited

U.S. PATENT DOCUMENTS 3,230,556 A 1/1966 Wiusor
3,230,566 A 1/1966 Moody
3,644,950 A * 2/1972 Lindsay, Jr. ........... A61G 7/057 5/709
3,653,083 A 4/1972 Lapidus
3,778,851 A 12/1973 Howorth
4,267,611 A * 5/1981 Agulnick ........... A61G 7/05776 5/691
4,391,009 A 7/1983 Schlid et al.
4,660,388 A 4/1987 Greene
4,766,628 A 8/1988 Walker
4,788,729 A 12/1988 Walker
4,796,316 A * 1/1989 Boselli ................ A47C 27/146 5/724
4,829,616 A 5/1989 Walker
4,853,992 A 8/1989 Yu
4,862,921 A 9/1989 Hess
4,867,230 A 9/1989 Voss
4,890,344 A 1/1990 Walker
4,897,890 A 2/1990 Walker
4,908,895 A 3/1990 Walker
4,991,244 A 2/1991 Walker
5,144,706 A 9/1992 Walker
5,170,522 A 12/1992 Walker
5,184,612 A 2/1993 Augustine
5,265,599 A 11/1993 Stephenson et al.
5,295,709 A 3/1994 Bell
5,382,075 A 1/1995 Shih et al.
5,473,783 A 12/1995 Allen
5,493,742 A 2/1996 Klearman
5,509,154 A 4/1996 Shafer et al.
5,564,140 A 10/1996 Shoenhair et al.
5,566,409 A 10/1996 Klearman
5,596,778 A * 1/1997 Suzuki ................. A61F 7/0097 5/482
5,597,200 A 1/1997 Gregory et al.
5,642,546 A 7/1997 Shoenhair
5,652,484 A 7/1997 Shafer et al.
5,675,848 A 10/1997 Kappel
5,749,109 A 5/1998 Kappel
5,765,246 A 6/1998 Shoenhair
5,787,534 A 8/1998 Hargest et al.
5,878,807 A 3/1999 Takahashi
5,882,349 A 3/1999 Wilkerson et al.
5,903,941 A 5/1999 Shafer et al.
5,904,172 A 5/1999 Gifft et al.
5,921,858 A 7/1999 Kawai et al.
5,989,285 A 11/1999 DeVibiss et al.
6,006,524 A 12/1999 Park
6,037,723 A 3/2000 Shafer et al.
6,085,369 A 7/2000 Feher
6,102,936 A 8/2000 Augustine et al.
6,108,844 A 8/2000 Kraft et al.
6,119,463 A 9/2000 Bell
6,161,231 A 12/2000 Kraft et al.
6,202,239 B1 3/2001 Ward et al.
6,210,427 B1 4/2001 Augustine et al.
6,223,539 B1 5/2001 Bell
6,263,530 B1 7/2001 Feher
6,336,237 B1 1/2002 Schmid
6,397,419 B1 6/2002 Mechache
6,421,859 B1 * 7/2002 Hicks ................ A61G 7/05715 5/737
6,483,264 B1 11/2002 Shafer et al.
6,493,889 B2 12/2002 Kocurek et al.
6,497,720 B1 12/2002 Augustine et al.
6,511,501 B1 1/2003 Augustine et al.
6,546,576 B1 4/2003 Lin
RE38,128 E 6/2003 Gallup et al.
6,596,018 B2 7/2003 Endo et al.
6,606,866 B2 8/2003 Bell
6,686,711 B2 2/2004 Rose et al.
6,700,052 B2 3/2004 Bell
6,701,556 B2 3/2004 Romano et al.
6,708,357 B2 3/2004 Gaboury et al.
6,763,541 B2 7/2004 Mahoney et al.
6,779,592 B1 8/2004 Ichigaya
6,804,848 B1 10/2004 Rose
6,832,397 B2 12/2004 Gaboury et al.
6,883,191 B2 4/2005 Gaboury et al.
7,036,163 B2 5/2006 Schmid
7,114,771 B2 10/2006 Lofy et al.
7,291,163 B2 11/2007 Gammons
7,296,315 B2 11/2007 Totten et al.
7,389,554 B1 6/2008 Rose
7,469,432 B2 12/2008 Chambers
7,475,464 B2 1/2009 Lofy et al.
7,480,950 B2 1/2009 Feher
7,480,953 B2 1/2009 Romano et al.
7,587,901 B2 9/2009 Petrovski
7,591,507 B2 9/2009 Giffin et al.
7,617,555 B2 11/2009 Romano et al.
7,640,754 B2 1/2010 Wolas
7,665,803 B2 2/2010 Wolas
7,708,338 B2 5/2010 Wolas
7,712,164 B2 5/2010 Chambers
RE41,765 E 9/2010 Gregory et al.
7,827,805 B2 11/2010 Comiskey et al.
7,865,988 B2 1/2011 Koughan et al.
7,877,827 B2 2/2011 Marquette et al.
7,908,687 B2 3/2011 Ward et al.
7,914,611 B2 * 3/2011 Vrzalik ............. A61G 7/05715 95/52
7,937,789 B2 5/2011 Feher
7,963,594 B2 6/2011 Wolas
7,966,835 B2 6/2011 Petrovski
7,975,331 B2 7/2011 Flocard et al.
7,996,936 B2 8/2011 Marquette et al.
8,065,763 B2 11/2011 Brykalski et al.
8,118,920 B2 2/2012 Vrazlik et al.
8,143,554 B2 3/2012 Lofy
8,181,290 B2 5/2012 Brykalski et al.
8,191,187 B2 6/2012 Brykalski et al.
8,220,090 B2 7/2012 Gowda
8,222,511 B2 7/2012 Gowda
8,256,236 B2 9/2012 Lofy
8,282,452 B2 10/2012 Grigsby et al.
8,332,975 B2 12/2012 Brykalski et al.
8,336,369 B2 12/2012 Mahoney
8,353,069 B1 1/2013 Miller
8,402,579 B2 3/2013 Marquette et al.
8,418,286 B2 4/2013 Brykalski et al.
8,434,314 B2 5/2013 Comiskey et al.
8,444,558 B2 5/2013 Young et al.
8,516,842 B2 8/2013 Petrovski
8,539,624 B2 9/2013 Terech et al.
8,621,687 B2 1/2014 Brykalski et al.
8,672,853 B2 3/2014 Young
8,732,874 B2 5/2014 Brykalski et al.
8,769,747 B2 7/2014 Mahoney et al.
8,782,830 B2 7/2014 Brykalski et al.
8,893,329 B2 11/2014 Petrovski et al.
8,931,329 B2 1/2015 Mahoney et al.
8,966,689 B2 3/2015 McGuire et al.
8,973,183 B1 3/2015 Palashewski et al.
8,984,687 B2 3/2015 Stusynski et al.
9,055,820 B2 6/2015 Axakov et al.

(56) References Cited

U.S. PATENT DOCUMENTS

| | | | | |
|---|---|---|---|---|
| 9,125,497 | B2 | 9/2015 | Brykalski et al. | |
| 9,131,781 | B2 * | 9/2015 | Zaiss | A47C 21/044 |
| 9,222,685 | B2 | 12/2015 | Lachenbruch | |
| 9,254,231 | B2 | 2/2016 | Vrzalik et al. | |
| 9,603,459 | B2 | 3/2017 | Brykalski et al. | |
| 9,622,588 | B2 | 4/2017 | Brykalski et al. | |
| 9,737,154 | B2 | 8/2017 | Mahoney et al. | |
| 9,814,641 | B2 | 11/2017 | Brykalski et al. | |
| 9,924,813 | B1 | 3/2018 | Basten et al. | |
| 9,974,394 | B2 | 5/2018 | Brykalski et al. | |
| 10,143,312 | B2 | 12/2018 | Brosnan et al. | |
| 10,194,752 | B2 | 2/2019 | Zaiss et al. | |
| 10,226,134 | B2 | 3/2019 | Brykalski et al. | |
| 10,405,667 | B2 | 9/2019 | Comiskey et al. | |
| 10,675,198 | B2 | 6/2020 | Brykalski et al. | |
| 10,772,438 | B2 | 9/2020 | Griffith et al. | |
| 11,020,298 | B2 | 6/2021 | Brykalski et al. | |
| 11,045,371 | B2 | 6/2021 | Brykalski et al. | |
| 11,083,308 | B2 * | 8/2021 | Zaiss | A47C 27/14 |
| 2003/0145380 | A1 * | 8/2003 | Schmid | A47C 21/048 5/423 |
| 2003/0234247 | A1 | 12/2003 | Stem | |
| 2004/0187216 | A1 | 9/2004 | Lin | |
| 2005/0011009 | A1 * | 1/2005 | Wu | A47C 7/748 5/423 |
| 2005/0086739 | A1 * | 4/2005 | Wu | A47C 27/007 5/423 |
| 2005/0278863 | A1 | 12/2005 | Bahash et al. | |
| 2006/0080778 | A1 | 4/2006 | Chambers | |
| 2006/0101577 | A1 | 5/2006 | Lussier | |
| 2006/0137099 | A1 | 6/2006 | Feher | |
| 2007/0033733 | A1 | 2/2007 | Jen | |
| 2008/0077020 | A1 | 3/2008 | Young et al. | |
| 2008/0173022 | A1 | 7/2008 | Petrovski | |
| 2009/0218855 | A1 | 9/2009 | Wolas | |
| 2010/0174198 | A1 | 7/2010 | Young et al. | |
| 2011/0107514 | A1 * | 5/2011 | Brykalski | A61G 7/057 5/652.1 |
| 2011/0115635 | A1 | 5/2011 | Petrovski et al. | |
| 2011/0144455 | A1 | 6/2011 | Young et al. | |
| 2011/0258778 | A1 | 10/2011 | Brykalski et al. | |
| 2011/0289684 | A1 * | 12/2011 | Parish | A47C 21/044 5/421 |
| 2011/0306844 | A1 | 12/2011 | Young | |
| 2012/0000207 | A1 | 1/2012 | Parish et al. | |
| 2012/0080911 | A1 | 4/2012 | Brykalski et al. | |
| 2012/0114512 | A1 | 5/2012 | Lofy et al. | |
| 2012/0131748 | A1 | 5/2012 | Brykalski et al. | |
| 2012/0144584 | A1 | 6/2012 | Vrazalik et al. | |
| 2012/0261399 | A1 | 10/2012 | Lofy | |
| 2012/0305043 | A1 | 12/2012 | Kossakovski et al. | |
| 2013/0037073 | A1 | 2/2013 | LaGrandeur et al. | |
| 2013/0059190 | A1 | 3/2013 | Kossakovski et al. | |
| 2013/0205506 | A1 | 8/2013 | Lachenbruch et al. | |
| 2013/0212808 | A1 | 8/2013 | Lachenbruch et al. | |
| 2013/0259965 | A1 | 10/2013 | Cloeren et al. | |
| 2013/0269106 | A1 | 10/2013 | Brykalski et al. | |
| 2014/0007656 | A1 | 1/2014 | Mahoney | |
| 2014/0026320 | A1 | 1/2014 | Comiskey et al. | |
| 2014/0182061 | A1 | 7/2014 | Zaiss et al. | |
| 2014/0250597 | A1 | 9/2014 | Chen et al. | |
| 2014/0257571 | A1 | 9/2014 | Chen et al. | |
| 2014/0259417 | A1 | 9/2014 | Nunn et al. | |
| 2014/0259418 | A1 | 9/2014 | Nunn et al. | |
| 2014/0259431 | A1 | 9/2014 | Fleury et al. | |
| 2014/0259433 | A1 | 9/2014 | Nunn et al. | |
| 2014/0259434 | A1 | 9/2014 | Nunn et al. | |
| 2014/0277611 | A1 | 9/2014 | Nunn et al. | |
| 2014/0277778 | A1 | 9/2014 | Nunn et al. | |
| 2014/0277822 | A1 | 9/2014 | Nunn et al. | |
| 2014/0366277 | A1 * | 12/2014 | Niederkrom | A61G 7/057 5/652.2 |
| 2015/0007393 | A1 | 1/2015 | Palashewski | |
| 2015/0025327 | A1 | 1/2015 | Young et al. | |
| 2015/0026896 | A1 | 1/2015 | Fleury et al. | |
| 2015/0157137 | A1 | 6/2015 | Nunn et al. | |
| 2015/0157519 | A1 | 6/2015 | Stusynski et al. | |
| 2015/0182033 | A1 | 7/2015 | Brosnan et al. | |
| 2015/0182397 | A1 | 7/2015 | Palashewski et al. | |
| 2015/0182399 | A1 | 7/2015 | Palashewski et al. | |
| 2015/0182418 | A1 | 7/2015 | Zaiss | |
| 2015/0238020 | A1 | 8/2015 | Petrovski et al. | |
| 2016/0066701 | A1 | 3/2016 | Diller et al. | |
| 2016/0100696 | A1 | 4/2016 | Palashewski et al. | |
| 2016/0235210 | A1 | 8/2016 | Lachenbruch et al. | |
| 2016/0367039 | A1 | 12/2016 | Young et al. | |
| 2017/0071359 | A1 | 3/2017 | Steele et al. | |
| 2017/0079444 | A1 | 3/2017 | Blazar | |
| 2017/0273470 | A1 | 9/2017 | Brykalski et al. | |
| 2017/0280883 | A1 | 10/2017 | Diller | |
| 2020/0037776 | A1 | 2/2020 | Brykalski et al. | |
| 2020/0337470 | A1 | 10/2020 | Sayadi et al. | |
| 2021/0037987 | A1 | 2/2021 | Griffith et al. | |
| 2021/0038453 | A1 | 2/2021 | Brykalski et al. | |

FOREIGN PATENT DOCUMENTS

| | | |
|---|---|---|
| JP | H08-140808 | 6/1996 |
| WO | WO 1997/038607 | 10/1997 |
| WO | WO 2007/060371 | 5/2007 |
| WO | WO 2007/093783 | 8/2007 |
| WO | WO 2008/098945 | 8/2008 |
| WO | WO 2005/120295 | 12/2008 |
| WO | WO 2011/026040 | 3/2011 |

OTHER PUBLICATIONS

U.S. Appl. No. 15/973,279, filed May 7, 2018, Brykalski et al.
U.S. Appl. No. 17/139,227, filed Dec. 31, 2020, Grabinger et al.
U.S. Appl. No. 17/139,243, filed Dec. 31, 2020, Grabinger et al.
U.S. Appl. No. 17/139,259, filed Dec. 31, 2020, Grabinger et al.
U.S. Appl. No. 17/139,353, filed Dec. 31, 2020, Karschnik et al.
U.S. Appl. No. 17/139,668, filed Dec. 31, 2020, Karschnik et al.
U.S. Appl. No. 17/139,683, filed Dec. 31, 2020, Karschnik et al.
U.S. Appl. No. 17/139,785, filed Dec. 31, 2020, Karschnik et al.
U.S. Appl. No. 17/139,786, filed Dec. 31, 2020, Karschnik et al.
U.S. Appl. No. 17/139,789, filed Dec. 31, 2020, Karschnik et al.
U.S. Appl. No. 17/139,851, filed Dec. 31, 2020, Karschnik et al.
U.S. Appl. No. 17/140,702, filed Jan. 4, 2021, Karschnik et al.
U.S. Appl. No. 17/360,378, filed Jun. 28, 2021, Brykalski et al.
U.S. Appl. No. 17/360,420, filed Jun. 28, 2021, Brykalski et al.
PCT International Preliminary Report on Patentability in International Appln. No. PCT/US2013/078106, dated Jul. 9, 2015, 11 pages.
PCT International Search Report and Written Opinion in International Appln. No. PCT/US2013/078106, dated Mar. 11, 2014, 6 pages.
PCT International Written Opinion in International Appln. No. PCT/US2013/078106, dated Mar. 11, 2014, 9 pages.
PCT Invitation to Pay Additional Fees in International Appln. No. PCT/US2013/078106, dated Feb. 24, 2014, 6 pages.
Response filed May 9, 2014 to PCT International Search Report dated Mar. 11, 2014 in Appln. No. PCT/US2013/078106, 9 pages.

* cited by examiner

DISTRIBUTION PAD FOR A TEMPERATURE CONTROL SYSTEM

CROSS-REFERENCE TO RELATED APPLICATIONS

This application is a continuation of U.S. application Ser. No. 16/240,351, filed Jan. 4, 2019, which is a continuation of U.S. application Ser. No. 14/842,177, filed Sep. 1, 2015 (now U.S. Pat. No. 10,194,752), which is a continuation and claims priority to U.S. application Ser. No. 13/728,087, filed on Dec. 27, 2012 (now U.S. Pat. No. 9,131,781). The disclosure of the prior application is considered part of the disclosure of this application, and is incorporated in its entirety into this application.

BACKGROUND

Comfort while sleeping can often depend on the ambient conditions immediately proximate to a user, such as local temperatures and humidity levels within a bed. While large-scale environmental control, such as heating, ventilation, and air conditioning (HVAC) can provide comfort control to the building as a whole, large-scale environmental control generally cannot provide for personalized control or for fine-tuning of thermal comfort within the bed.

SUMMARY

The present disclosure is directed to a system including a distribution pad that can be placed on a mattress to provide for personalized heating or cooling of the personal space of a user. Heated or cooled air can be fed into the distribution pad from a device, referred to herein as an engine, that can provide heated air, cooled air, or both. The distribution pad is configured to provide desired circulation of the heated or cooled air through the distribution pad and into the user's personal space.

The present describes an air distribution pad that can be placed on a mattress, the distribution pad comprising an upper layer, a lower layer, and a spacer material located between the upper layer and the lower layer, the spacer material configured to allow air to pass therethrough. The air distribution pad also includes an air distributor configured to distribute air to the spacer material, wherein the air distributor comprises a port configured to receive an air hose, wherein the port is directed laterally sideways from the air distributor. At least one joining structure is coupled to the upper layer and the lower layer, the at least one joining structure providing one or more channels formed through the spacer material in fluid communication with the air distributor. The one or more channels are configured to direct generally laterally flowing air from the port of the air distributor to a generally longitudinal direction along the at least one channel.

The present disclosure also describes an air distribution pad that can be placed on a mattress, the distribution pad comprising an upper layer, a lower layer, and a spacer material located between the upper layer and the lower layer, the spacer material configured to allow air to pass therethrough. The air distribution pad also includes an air distributor configured to distribute air to the spacer material, wherein the air distributor comprises a port configured to receive an air hose. Stitching couples the upper layer and the lower layer and extends through the spacer material. The stitching provides one or more channels formed through the spacer material in fluid communication with the air distributor. At least one of the top layer and the bottom layer defines openings in communication with the one or more channels. The one or more channels are configured to direct air from the air distributor along the one or more channels and out of the openings.

The present disclosure also describes a system comprising an air distribution pad including an upper layer, a lower layer, and a spacer material located between the upper layer and the lower layer, the spacer material configured to allow air to pass therethrough. The air distribution pad also includes an air distributor configured to distribute air to the spacer material, wherein the air distributor comprises a port. Stitching couples the upper layer and the lower layer and extends through the spacer material. The stitching provides one or more channels formed through the spacer material in fluid communication with the air distributor. The one or more channels are configured to direct air from the air distributor along the one or more channels. The system also includes an engine configured to perform at least one of heating air or cooling air and an air deliver hose with a first end coupleable to the engine and a second end coupleable to the port of the air distributor.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

This disclosure describes an air distribution system and various components of the air distribution system that can provide heated air, cooled air, or both to a personal space of a user while the user is lying on a mattress or other cushion. The system can provide for improved comfort of the user and improved control over ambient temperature or humidity, or both, within the personal space of the user.

Figure 1:
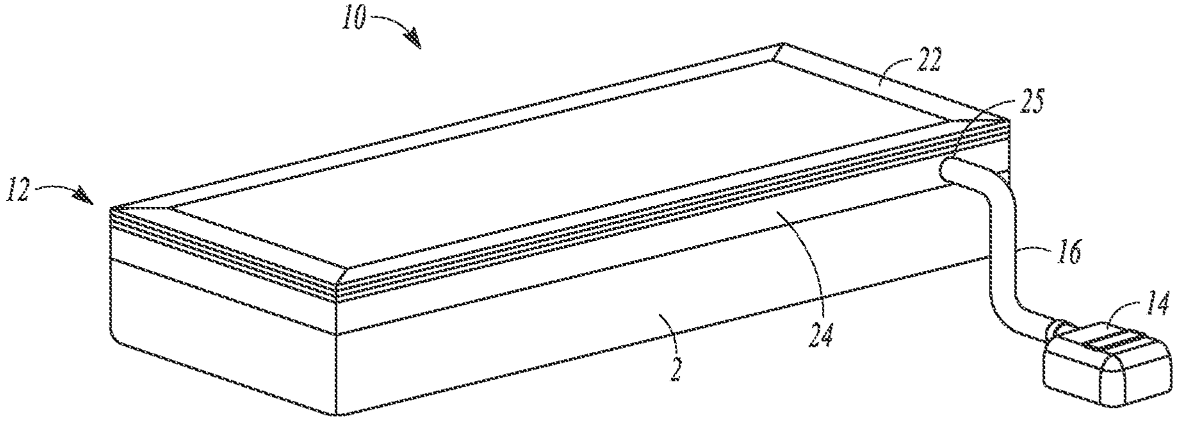
FIG. 1 is a perspective view of an example system for providing heated or cooled air, or both, to a personal space of a user lying on a mattress.
Figure 2:
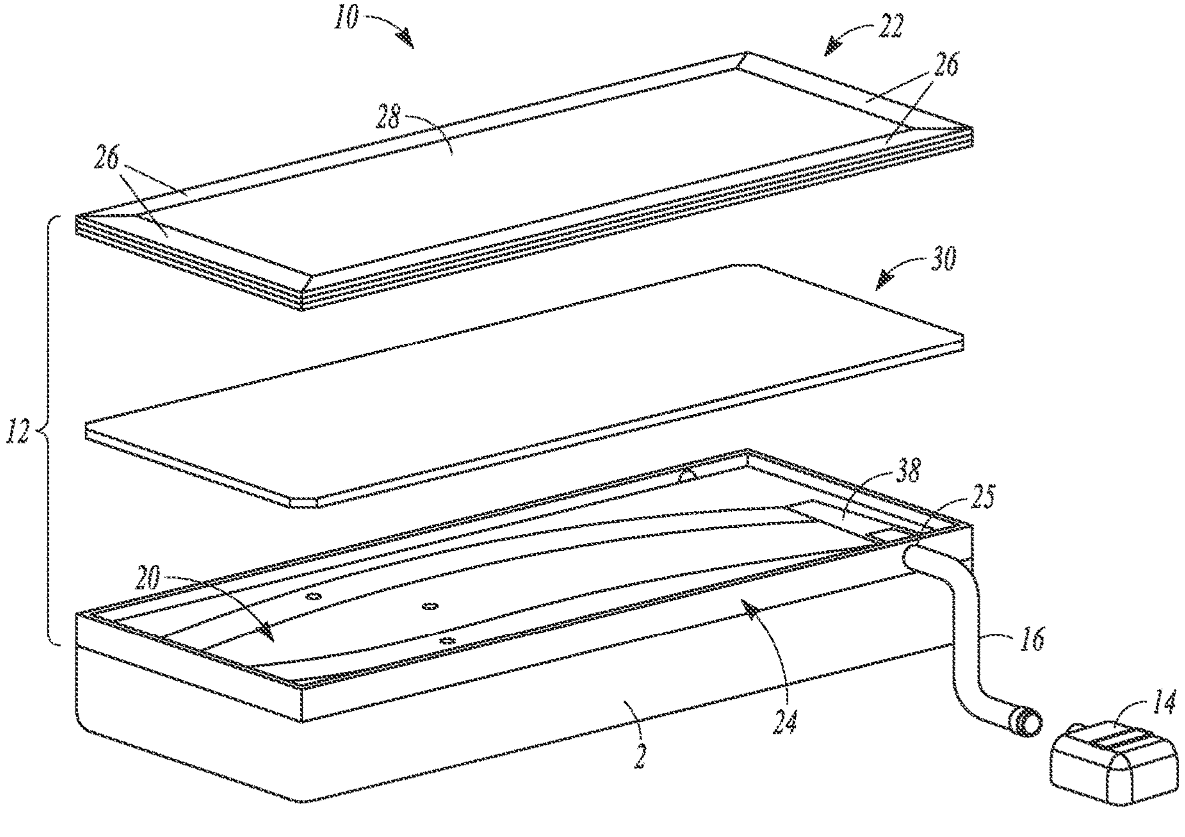
FIG. 2 is an exploded view the example system shown in FIG. 1.

FIGS. 1 and 2 show an example sleep system 10 that can include an air distribution pad 12 placed on a mattress 2. The air distribution pad 12 can distribute heated or cooled air supplied from an air source, such as from a heating or cooling engine 14 (referred to herein as an "engine 14") via an air delivery hose 16. The air distribution pad 12 can distribute the air along and through the air distribution pad 12 in order to heat or cool a user lying or sitting on the sleep system 10.

The mattress 2 can be any mattress that can be used for sleep or rest, such as a standard sized mattress for human sleep. In an example, the mattress 2 shown in FIGS. 1 and 2 can be a mattress designed for a single user, such as a standard twin-sized mattress (e.g., about 39 inches (about 100 cm) wide and about 75 inches (about 190 cm) long) or a long twin-sized mattress (e.g., about 36 inches (about 91 cm) wide and about 80 inches (about 200 cm) long). In another example, the mattress 2 can be designed for two or more users, such as a queen-sized mattress (e.g., about 60 inches (about 150 cm) wide and about 80 (about 200 cm) long) or a king-sized mattress (e.g., about 76 inches (about 195 cm) and about 80 inches (about 200 cm) long). The mattress 2 can be of any type of mattress, such as a spring mattress, an air mattress, or a waterbed mattress. In an example, the mattress 2 comprises an adjustable air bladder mattress, such as the Innovation Series I8 TXL Sleep Number mattress sold by Select Comfort Corp., Minneapolis, MN, USA.

As best shown in FIG. 1, the air distribution pad 12 can be sized to fit substantially the entire upper surface of a twin-sized mattress 2, to correspond to the personal area occupied by a single person. The air distribution pad 12 can be sized so that two or more air distribution pads 12 can be placed on the same mattress 2. For example, two air distribution pads 12 can be placed on top of a mattress 2 that is sized for two people, such as an Innovation Series I8 Queen or King-sized mattress 2, sold by Select Comfort Corp., Minneapolis, MN, USA. Each person occupying the mattress 2 can then have their own air distribution pad 12. In such as case, each air distribution pad 12 can have its own air source, e.g., its own engine 14 and air delivery hose 16, and its own control.

The engine 14 can provide a cooling or a heating effect to air that can then be directed into the air distribution pad 12 with the hose 16. In an example, the engine 14 can comprise a thermoelectric device, also referred to as a Peltier cooling device or a thermoelectric heat pump, which can produce a temperature difference across the device when a voltage is applied across the device. The thermoelectric device can operate due to the Peltier effect, wherein when an electrical current flows through two dissimilar conductors or semiconductors, the junction between the two conductors or semiconductors can either absorb or release heat depending on the direction of electricity flow. The thermoelectric device can be configured so that a first side of the thermoelectric device will absorb heat (e.g., will be cooled), while an opposed second side of the thermoelectric device will release heat (e.g., will be heated).

Air can be drawn into the engine 14, such as with a fan (not shown), and the air can be directed either be cooled or heated, depending on the polarity of the voltage applied to the thermoelectric device, as it passes through the thermoelectric device depending on the desired type of air to be delivered to the mattress 2. The engine 14 can be configured to provide for a plurality of temperature settings and a plurality of air-flow settings. For example, the engine 14 can be configured with a set number of discrete "cooling" settings each corresponding to varying degrees of heat removal (e.g., cooling) by the thermoelectric device in the engine 14. Similarly, the engine 14 can be configured with a discrete number of "heating" settings each corresponding to varying degrees of heat supply (e.g., heating) by the thermoelectric device in the engine 14. The engine 14 can also be configured with a heating-neutral setting, e.g., with the thermoelectric device being inactive, but with the fan or other air moving device still providing air flow. In another example, the engine 14 can be configured with a continuous temperature control setting, rather than discrete temperature settings, so that a user can select varying degrees of heating or cooling along a continuous or substantially continuous spectrum between an upper heating or cooling level and a lower heating or cooling level. The control of air flow (e.g., air flow rate) can also be configured to be either discrete or continuous.

Further details of an example thermoelectric device that can be used with the air distribution pad 12 of the present disclosure is described in U.S. Published Patent Application No. 2012/0000207, filed on Sep. 13, 2011, the entire disclosure of which is incorporated herein by reference.

The air distribution pad 12 can be configured to provide for desired or optimized delivery of air from the engine 14 so that a person sitting or lying on the air distribution pad 12 can have improved comfort, such as via a heating or cooling effect. FIG. 2 shows an exploded view of an example air distribution pad 12 that can be used with the sleep system 10. The air distribution pad 12 can include an active layer 20, which can include one or more structures to receive the heated or cooled air from the engine 14 and to distribute the air along the length of the active layer 20 and to a personal space of a user lying or sitting on the air distribution pad 12. In an example, the active layer 20 can be the only structure or layer of the air distribution pad 12, e.g., such that the active layer 20 is the air distribution pad 12. In other examples, such as the examples shown in FIG. 2, the active layer 20 can be used in conjunction with other components of the air distribution pad 12.

As shown in the example of FIG. 2, the air distribution pad 12 can include a cover that can at least partially enclose the active layer 20. For example, a cover can be formed by joining of an upper cover portion 22 and a lower cover portion 24. The cover 22, 24 can enclose the active layer 20 and, if desired, one or more additional structures or layers that can provide for comfort of the user. In an example, the lower cover portion 24 can comprise a substantially air impermeable and moisture impermeable material so that air being distributed from the air distribution pad 12 will be directed upward toward the user and so that moisture, such as sweat from the user, will not pass down onto or into the mattress 2. The cover 22, 24 can also include an opening 25 through which the air delivery hose 16 can pass.

The upper cover portion 22 can comprise a frame 26 that also comprises a substantially air impermeable and substantially moisture impermeable material, with the frame 26 surrounding an inner air and moisture permeable window 28. In an example, the lower cover portion 24 and the frame 26 of the upper cover portion 22 can comprise a poly-vinyl chloride (PVC) layer or PVC-coated or polyurethane-backed cloth material, while the air and moisture permeable window 28 can comprise a mesh or screen-like fabric of high air permeability to allow air and moisture to flow freely from the air distribution pad 12 through the window 28. In an example, the upper cover portion 22 and the lower cover portion 24 can be removably coupled to each other, such as via a zipper around the outer edges of the portions 22, 24.

In addition to the active layer 20, the cover 22, 24 can also enclose a comfort layer 30 that can provide for added comfort for the user. The comfort layer 30 can be placed on top of the active layer 20, as shown in FIG. 2. The comfort layer 30 can comprise a resilient foam material that is air permeable so that air released from the air distribution pad 12 can flow through the comfort layer 30 and the window 28 to the personal space of the user. The comfort layer 30 can also comprise a plurality of passages (not shown) that pass between the upper side and the lower side of the comfort layer 30 in order to allow better airflow through the comfort layer 30. An example of a foam material that can be used for the comfort layer 30 is a visco-elastic foam, such as a visco-elastic polyurethane polyether foam. The foam of the comfort layer 30 can have a thickness from about 0.25 inches to about 2 inches, such as from about 0.5 inches to about 1.5 inches, for example about ¾ inches. The foam can have a density that is selected for a desired firmness or compressibility, such as from about 2 pounds per cubic foot to about 4 pounds per cubic foot, such as about 3 pounds per cubic foot. An example of the foam material that can be used to make the comfort layer 30 is a visco-elastic polyurethane-polyether foam manufactured by Future Foam, Inc., Council Bluffs, IA, USA.

Figure 3:
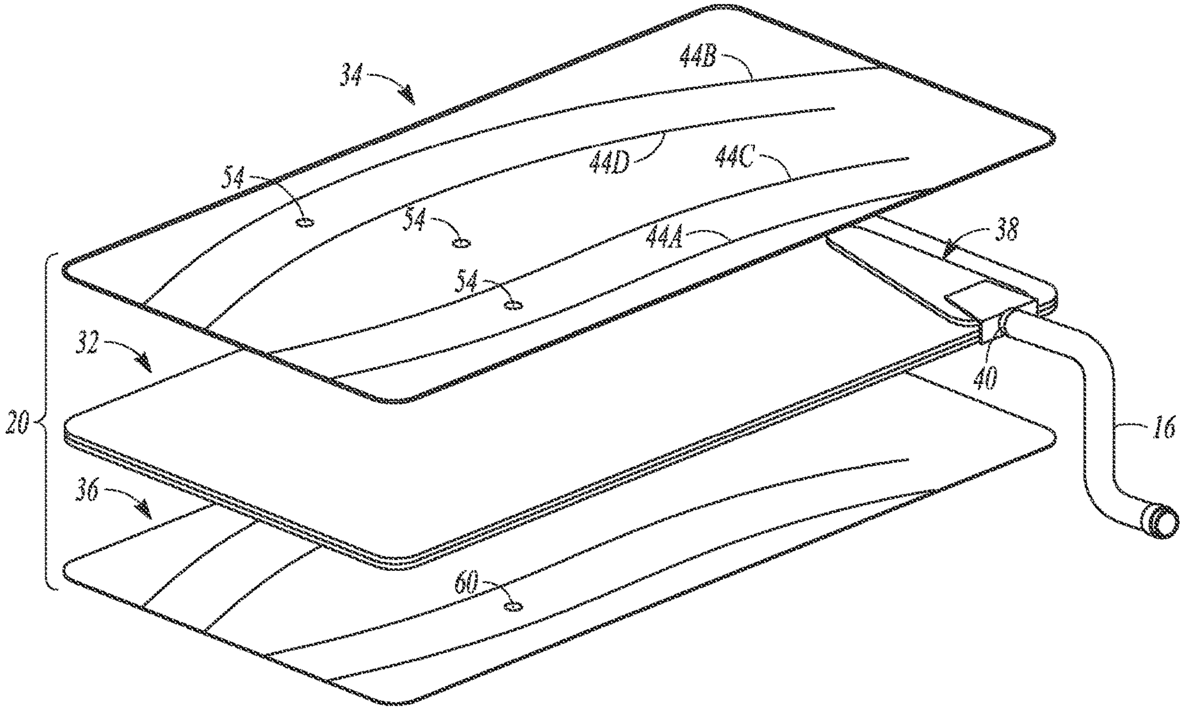
FIG. 3 is an exploded view of an example active layer of an air distribution pad usable with the example system of FIG. 1.
Figure 4:
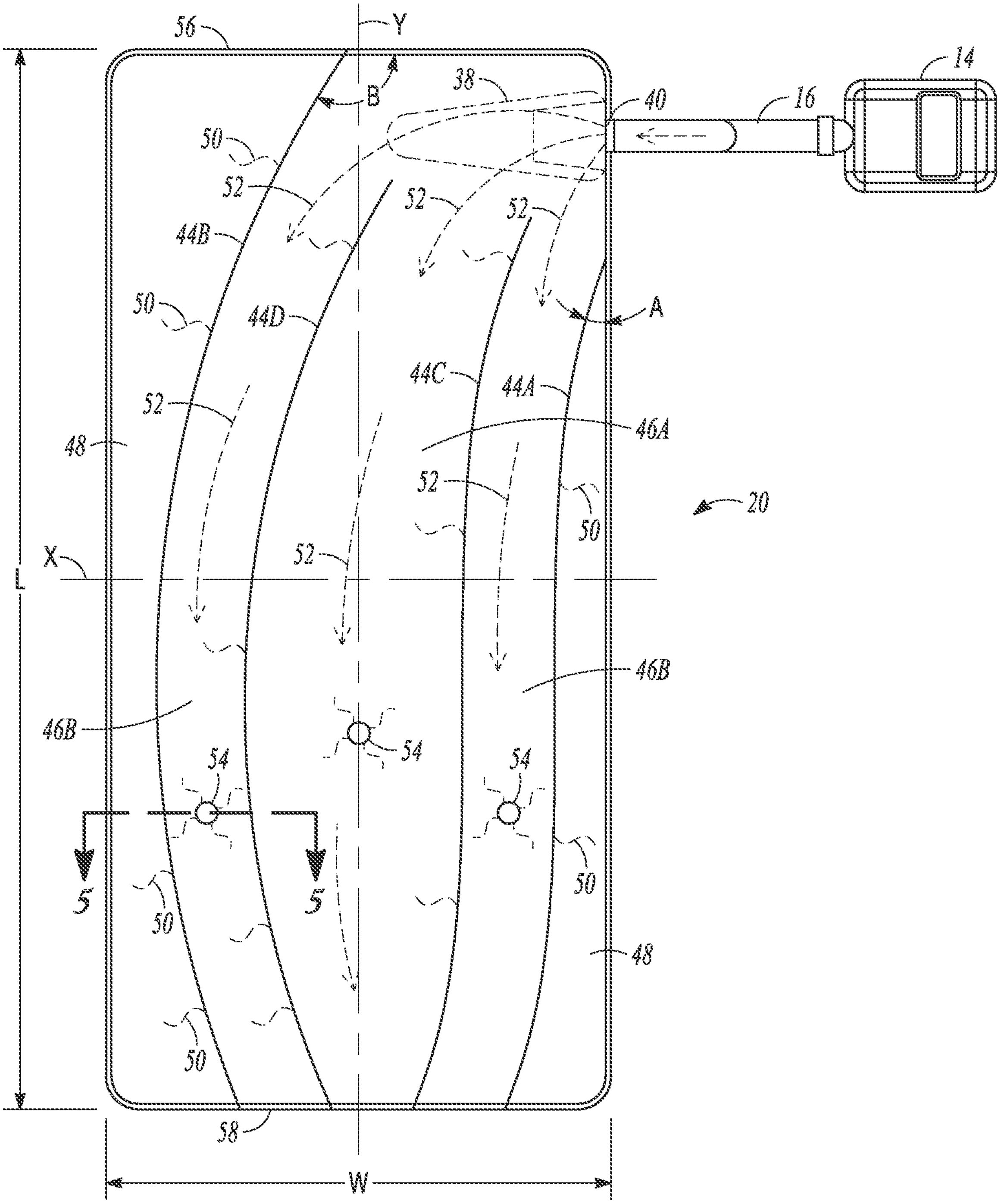
FIG. 4 is a top view of the example active layer from FIG. 3 assembled.
Figure 5:
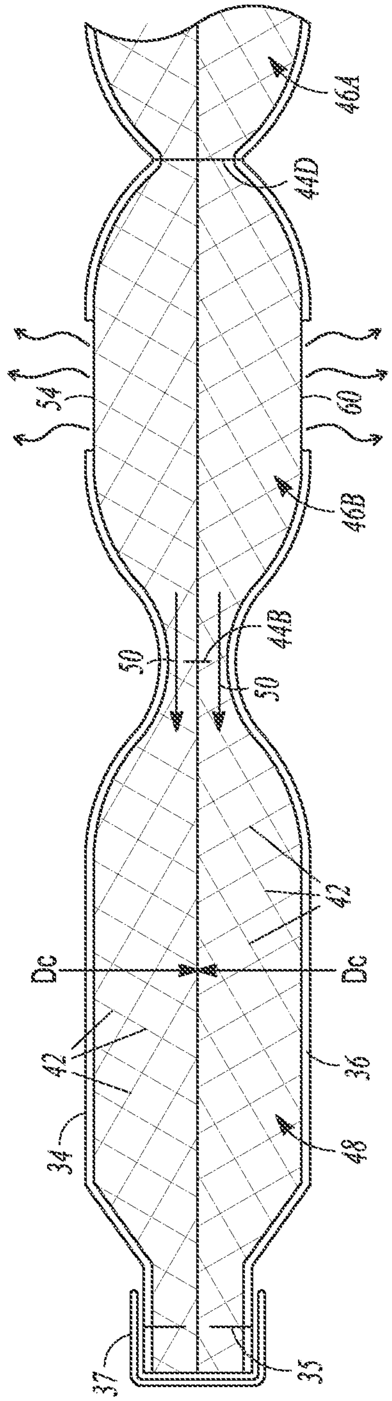
FIG. 5 is a cross-sectional view of the example active layer taken along the line 5-5 in FIG. 4.

FIGS. 3-5 show additional details of an example active layer 20 that can be used with the example sleep system 10 of the present disclosure. FIG. 3 shows an exploded view of the active layer 20, FIG. 4 shows a top view of the assembled active layer 20, and FIG. 5 shows a cross-sectional view of the active layer 20 taken along line 5-5 in FIG. 4. The active layer 20 can include an internal spacer layer 32 that can be at least partially surrounded or enclosed by an external casing. The external casing can comprise an upper layer 34 and a lower layer 36 that can be joined together, such as by stitching, welding, with a joining structure, and the like. The external casing 34, 36 can substantially surround and encase the spacer layer 32 The spacer layer 32 can comprise a structure that permits air to flow relatively freely through the spacer layer 32, such as a foam or a reticulated engineered material (described in more detail below). The active layer 20 can also comprise an air distributor 38 to distribute incoming air from the air delivery hose 16 throughout the spacer layer 32, as described in more detail below. The external casing 34, 36 can substantially encase the air distributor 38 as well, and can leave an opening (not shown) for a port 40 that can receive the air delivery hose 16.

The spacer layer 32 can include one or more layers of a spacer material that are configured to provide sufficient support to a user sitting or lying on the air distribution pad 12 so that air can flow through the spacer layer 32, but which is resilient or forgiving enough to be comfortable for the user. In an example, best seen in FIGS. 3 and 5, the spacer layer 32 comprises two separate layers of spacer material.

As shown in the cross-sectional view of FIG. 5, each spacer layer 32 (e.g., of two spacer layers 32 shown in the example of FIG. 5) can comprise an engineered spacer material, such as a spacer material comprising a plurality of resilient fibers 42. The resilient fibers 42 can be positioned and oriented in the spacer material to provide for resilient support in a direction of compression $D_C$ that is orthogonal or substantially orthogonal to a plane of the spacer layer 32. In other words, the fibers 42 can provide resilient support in a direction extending between the upper surface and the lower surface of the active layer 20. The fibers 42 can be compressed in the compression direction $D_C$ when a force is applied in the compression direction $D_C$, such as a portion of the weight of a user, but return back to their original shape when the force is removed. The fibers 42 can comprise resilient polymer fibers, such as polyester fibers. An example of a spacer material that can be used in the spacer layer 32 is a 3D spacer fabric having a thickness from about ⅓ inches to about 1 inch, for example about ¾ inches, such as the 3D spacer fabrics manufactured by Bodet & Horst GmbH & Co. K G, Eiterlein, Germany or Pressless GmbH, Falkenau, Germany, or Welcool Cushion Technology Co., Ltd., Fujian, China.

In an example, the air distribution pad 12 can be configured so that it is "cushion-neutral" to the user, e.g., so that the cushioning effect that is experienced by the user feels the same or substantially the same with the presence of the air distribution pad 12 as it does without the air distribution pad 12. For example, the active layer 20, including the spacer layer 32, can be relatively firm to ensure that air will be able to flow through the spacer layer 32. The comfort layer 30 can be selected to be relatively soft so that the active layer 20 and the comfort layer 30 can combine to feel neutral. A "cushion-neutral" feel to the air distribution pad 12 can allow a user to add the sleep system 10 to their existing bed without experiencing a change in comfort compared to what the user has grown accustomed. A "cushion-neutral" feel can also allow and adjustable bed, such as the Select Comfort SLEEP NUMBER™ Bed, to have the expected response to adjustment, rather than the adjustment being masked by an overly soft or an overly stiff air distribution pad 12.

The external casing 34, 36 can be formed from a material having a relatively low permeability to air so that at least a portion of the air flowing through the spacer layer 32 can permeate through the upper layer 34 to be directed toward a personal area of the user. In an example, the upper layer 34 facing the user can be sufficiently permeable to allow some air to permeate out of the spacer layer 32 through the upper layer 34, but not so permeable that all of the air being delivered from the air delivery hose 16 permeates through the upper layer 34 before the air can flow through a substantial portion of the length of the active layer 20. Additional permeability through the upper layer 34 can be achieved due to stitching that can join the upper layer 34 to the lower layer 36, such as stitching 44 (described in more detail below). The stitching 44 can create small puncture holes in the layers 34, 36 that can allow air to leak from the spacer layer 32 into the user's personal space. In an example, the upper layer 34 can have a permeability of from about 0.1 $ft^3/min/ft^2$ to about 10 $ft^3/min/ft^2$, such as from about 0.5 $ft^3/min/ft^2$ to about 7 $ft^3/min/ft^2$, for example about 0.7 $ft^3/min/ft^2$ (as measured by a standard test method for air permeability of textile fabrics, such as ASTM D737.) In an example, the upper layer 34 can comprise a polyester fabric, such as a 100% polyester, with a urethane laminate backing, such as fabric sold under the trade name Semi Permeable Knit Fabric by Spec-Tex Inc., Coral Springs, FL, USA.

The lower layer 36 can have the same permeability as the upper layer 34, e.g., can be made from the same material, or the lower layer 36 can have a different permeability. In an example, the lower layer 36 can be substantially air impermeable, or relatively less air permeable than the upper layer 34, so that air flowing through the spacer layer 32 will tend to permeate through the upper layer 34 toward the user rather than through the lower layer 36 toward the mattress 2. However, air can be directed through the upper layer 34 rather than the bottom layer 36 due to the bottom cover 24 being made from a substantially air impermeable material.

The upper layer 34 and the lower layer 36 can be joined together at the periphery of the layers 34, 36, such as with stitching 35 or fabric tape 37 at the periphery, as shown in FIG. 5. The upper layer 34 and the lower layer 36 can also be joined together at specified locations of the active layer 20 in order to provide channels through the active layer 20 that can direct the flow of air received from the engine 14.

In an example, one or more joining structures 44A, 44B, 44C, 44D (collectively referred to herein as "joining structure(s) 44"), such as stitching, can join the layers 34, 36 together to form at least one primary channel 46A, 46B (collectively referred to herein as "primary channel(s) 46") and at least one secondary channel 48. In an example, the stitching or other joining structures 44 can pass through the spacer layer 32 to join the upper layer 34 and the lower layer 36 together so that the same spacer layer 32 extends throughout substantially the entire active layer 20 (e.g., through the one or more primary channels 46 and the one or more secondary channels 48).

In an example, the primary channels 46 direct air through the active layer 20 (e.g., through the spacer layer 32) substantially directly from the air distributor 38, e.g., such that the only obstacle to air flow between the air distributor 38 and the primary channels 46 are the fibers 42 within the spacer layer 32. In contrast, the secondary channels 48 can be indirectly connected to the air distributor 38, e.g., such that an airflow path from the air distributor 38 to a secondary channel 38 passes through a primary channel 46 and through a joining structure 44, such as stitching.

In an example, the permeability of air between a primary channel 46 and a secondary channel 48 is relatively low, particularly compared to the air permeability through the spacer layer 32 along the primary channels 46, which can allow the air to flow relatively freely. The secondary channels 48 are not, necessarily, completely devoid of air flowing through the channels 48. However, in an example, the secondary channels 48 have no large paths for the ingress into or exit from the secondary channels 48, such that any air flow through a secondary channel 48 can have a substantially smaller flow rate than the air flow through a primary channel 46. For example, as shown in the example of FIG. 4, one or more of the joining structures 44A, 44B can extend along substantially the entire length L of the active layer 20 to form a separation between a set of primary channels 46, e.g., the laterally interior channels 46A and 46B, and a set of secondary channels 48, e.g., the laterally exterior channels 48. A small amount of air can leak through the joining structures 44A, 44B between the primary channels 46A, 46B and the secondary channels 48, as represented by air flow lines 50 in FIGS. 4 and 5, but this air leak flow is considerably smaller and more sporadic than the steady and substantially continuous air flow through the primary channels 46A, 46B, as represented by the air flow lines 52 in FIG. 4.

The purpose of splitting the active layer 20 into primary channels 46 and secondary channels 48 is to promote improved or optimum air flow through the active layer 20. In some examples, the engine 14 will have a limited flow rate that it can generate to push air through the air delivery hose 16, the air distributor 38, and the spacer layer 32, such that if the active layer 20 was not divided into primary channels 46 and secondary channels 48, the engine 14 might not be able to provide a sufficient flow rate to provide any noticeable heating or cooling effect for the user. The channels 46, 48 can also be configured so that heated air or cooled air from the engine 14 will be directed to specified locations of the active layer 20 that are expected to have ideal perceived heating or cooling effect to a user.

In an example, shown in FIG. 4, the at least one primary channel 46 can comprise a primary channel 46 located generally laterally centrally in the active layer 20, with at least one secondary channel 48 on each lateral side of the centrally located primary channel 46. For the purpose of optimal air flow and temperature distribution across the air distribution pad 12, the generally centrally located primary channel 46 can be split into two or more sub-channels, such as a middle primary channel 46A with the lateral side primary channels 46B on either side of the middle primary channel 46A, as shown in FIG. 4. The centrally located primary channel 46 (split into sub-channels 46A and 48B in FIG. 4) and the secondary channels 48 can be defined by a first joining structure 44A proximate a first lateral side of the active layer 20 where air is delivered from the hose 16 (e.g., the right side in the view shown in FIG. 4) and a second joining structure 44B proximate a second lateral side of the active layer 20 opposite the side the air is delivered from (e.g., the left side in FIG. 4). A third joining structure 44C and a fourth joining structure 44D can split the centrally located primary channel 46 into a middle primary channel 46A with two lateral side primary channels 46B.

The joining structures 44 can comprise any structure that is capable of reliably joining the upper layer 34 to the lower layer 36, and in particular to any structure that can join the upper layer 34 to the lower layer 36 to provide for reduced air permeability through the spacer layer 32 across the joining structure 44 so that secondary channels 48 can be formed. Examples of joining structures 44 that can be used include, but are not limited to, fasteners such as stables, brads, pins, and the like, welding (e.g., for plastic or polymer containing layers 34, 36), adhesives, and stitching. In an example, the upper layer 34 and the lower layer 36 can both comprise fabric material, as can the spacer layer 32 between layers 34, 36, such that stitching can be an inexpensive and desirable joining structure 44. FIG. 5 shows a cross-sectional view showing a stitching joining structure 44B between a primary channel 46B and a secondary channel 48, and a corresponding stitching joining structure 44D between a first primary channel 46A and a second primary channel 46B. As shown in FIG. 5, the stitching 44 can compress one or more spacer layers 32 between the upper layer 34 and the lower layer 36. The compression of the spacer layers 32 and the stitching 44 can reduce the air permeability of the spacer material of the spacer layer 32 across the stitching 44. As discussed above, however, the stitching 44 does not necessarily eliminate the passage of air from a primary channel 46 into a secondary channel 48, as indicated by the arrows 50, but the stitching 44 can provide resistance to air flow into the secondary channel 48.

The channels 46, 48 can be configured to redirect the direction of air flow of the air received from the air delivery hose 16, e.g., via the air distributor 38, from a generally lateral direction to a generally longitudinal direction. The term "lateral," as used herein, can refer to a direction across the active layer 20 extending along the width W. The term "longitudinal," as used herein, can refer to a direction along the active layer 20 extending along the length L. As best shown in FIGS. 3 and 4, the port 40 within the air distributor 38 that can receive the air delivery hose 16 can face laterally outward from a side of the active layer 20 so that the hose 16 approaches the active layer 20 from the lateral side. A lateral approach of the air delivery hose 16 can be preferred because many user's beds include a headboard on one longitudinal end of the bed or a footboard on the opposite longitudinal end, and a longitudinal approach of the hose 16 would interfere with the headboard or footboard. However, it can be preferred that the air flow through the air distribution pad 12 be generally longitudinal in direction. Therefore, as best seen in FIG. 4, the laterally-entering air flow can be redirected to a generally longitudinal direction along the primary channel(s) 46, e.g., by the joining structures 44A, 44B, 44C, and 44D. As shown in FIG. 4, the configuration of the primary channels 46 (e.g., through the placement of the joining structures 44) can be such that the air flow is gradually redirected in a continuous or substantially continuous arc into each primary channel 46.

At least one of the joining structures 44 on a lateral side of the active layer 20 proximate to the air distributor 38 (e.g., joining structures 44A and 44C on the right side of the active layer 20 in FIG. 4) can form an acute angle A relative to a longitudinal axis Y of the active layer 20. At least one of the joining structures 44 on a lateral side opposite the air distributor 38 (e.g., joining structures 44B and 44D on the left side of the active layer 20 in FIG. 4) can form an obtuse angle B relative to a lateral axis X of the active layer 20. In an example, the acute angle A of the first joining structures 44 proximate to the air distributor 38 (e.g., joining structures 44A and 44C) can be from about 10° to about 35°, such as from about 20° to about 30°, for example about 23°. In an example, the obtuse angle B of the second joining structures 44 opposite the air distributor 38 (e.g., joining structures 44B and 44D) can be from about 90° to about 150°, such as from about 100° to about 135°, for example about 122°. In the example shown in FIG. 4, only the acute angle A on a first joining structure 44A is shown, but a similar acute angle relative to the longitudinal axis Y (e.g., in the same ranges as acute angle A) can be selected for another joining structure 44C on the same lateral side proximate the air distributor 38. Similarly, in the example shown in FIG. 4, only the obtuse angle B on a second joining structure 44B is shown, but a similar obtuse angle relative to the lateral axis X (e.g., in the same ranges as obtuse angle B) can be selected for another joining structure 44D on the same lateral side opposite the air distributor 38.

The joining structures 44 can also have a shape or shapes, or form a pattern or patterns, that can improve or optimize air flow through the active layer 20 in order to improve or optimize the heating or cooling effect experienced by the user. In an example, at least one of the joining structures 44 on a lateral side of the active layer 20 proximate to the air distributor 38 (e.g., joining structures 44A and 44C) can have a generally sinusoidal or "S" shape. As shown in the example of FIG. 4, both joining structures 44A and 44C on the lateral side proximate the air distributor 38 have a generally sinusoidal shape. In an example, at least one of the joining structures 44 on a lateral side opposite the air distributor 38 (e.g., joining structures 44B and 44D on the left side of the active layer 20 in FIG. 4) can form an arc shape, such as a concave arc with respect to the air distributor 38 (e.g., where a concave side of the arc faces the air distributor 38). As shown in the example of FIG. 4, both joining structures 44B and 44D on the lateral side opposite the air distributor 38 have an arc shape (e.g., concave arc with respect to the air distributor 38). The configurations of the joining structures 44A, 44B, 44C, 44D can provide for a desired air flow profile through the primary channels 46A, 46B, such as a relatively high volume of air flow through the middle primary channel 46A and a relative low volume of air flow through each of the side primary channels 46B.

As shown in FIGS. 3 and 4, the upper layer 34 can include one or more openings 54 that can provide an open path to air flow from the spacer layer 32 out of the active layer 20, e.g., so that the air flow into the user's personal space can be optimized for cooling or heating performance. Each opening 54 can be positioned over one of the primary channels 46 so that air from the primary channel 46 can exit through the opening 54. The openings 54 can allow a portion of the air flowing through the spacer layer 32 to more freely exit the active layer 20 at a specified point of the air distribution pad 12. As described above, although the upper layer 34 can be air permeable, if desired, it can have a relatively low air permeability to ensure that a portion of the air delivered from the air delivery hose 16 continues to flow down a substantial portion of the length of the primary channels 46. One reason for providing for air flow down the primary channels 46 is to provide for convective cooling of the material of the upper layer 34, which can then provide for convective cooling, conductive cooling, or both of the user through the upper layer 34 (which may need to occur through one or more other layers, such as the comfort layer 30 and the upper cover portion 22). The one or more openings 54 can allow for a portion of the air flowing through the active layer 20 to pass into the personal space of the user, which can provide for one or more of conductive, convective, or evaporative cooling of the user. The openings 54 can be located at a position of the active layer 20 where it can be desired to have increased convective cooling or evaporative cooling, or both, for the user The features of the upper layer 34 of the active layer 20 have been described in some detail. However, as will be appreciated, the lower layer 36 can have similar features to those described above for the upper layer 34. For example, the lower layer 36 can also be air permeable (as described above), and the joining structures 44 can be joined to the lower layer 36 as well as the upper layer 34. Similarly, the lower layer 36 can also include openings 60, which can be similar or identical to openings 54 in the upper layer 34. In an example, the upper layer 34 and the lower layer 36 can be configured to be substantially mirror images of each other. Mirror-image upper and lower layers 36, 38 can provide for several benefits to the active layer 20 and resulting air distribution pad 12. First, on a single-person bed (e.g., a standard twin- or long twin-sized bed), or on the same side of a two-person bed (e.g., a queen- or king-sized), the active layer 20 can be flipped in the longitudinal direction (e.g., about the lateral axis X) so that the position of the openings 60 will be at a different point relative to the user than openings 54 were. For example, if the openings 54 are at about two-thirds and about three-quarters of the length L from the top (e.g., the first end 56), when the active layer 20 is flipped, the openings 60 will be about one-quarter and about one-third of the length L from the new top end, which is now the second end 58. The air exiting the openings 60 will thus be encountered by the user near the user's upper torso, in contrast to the air from openings 54 when the active layer 20 has not been flipped which could be felt around the upper legs.

In addition, if the upper layer 34 and the lower layer 36 are mirror images of each other, the active layer 20 can be flipped laterally (e.g., about the longitudinal axis Y) so that the active layer 20 can be used on the opposite side of a two-person bed. In this way, a pair of active layers 20, and resulting air distribution pads 12, that are each sized for a single person can be placed on a single two-person bed (e.g., a queen- or king-sized bed). Each of the pair of active layers 20 and resulting air distribution pads 12 can be individually controlled, such as with separate engines 14, so that each individual user on the two-person bed can control their own personal comfort level independent of the other user on the bed. For example, if the two-person bed is being used by spouses, one spouse can have a relatively cool temperature setting, while the other spouse can have a relatively warm temperature setting.

Figure 6:
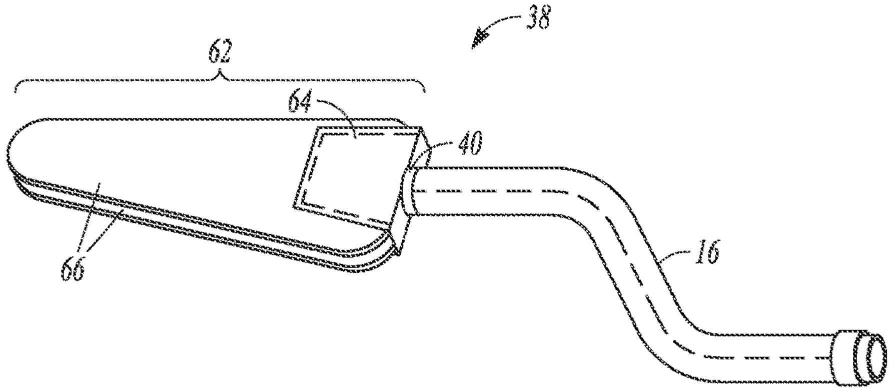
FIG. 6 is a perspective view of an example air distributor assembly that can be used with the example air distribution pad of FIG. 3.
Figure 7:
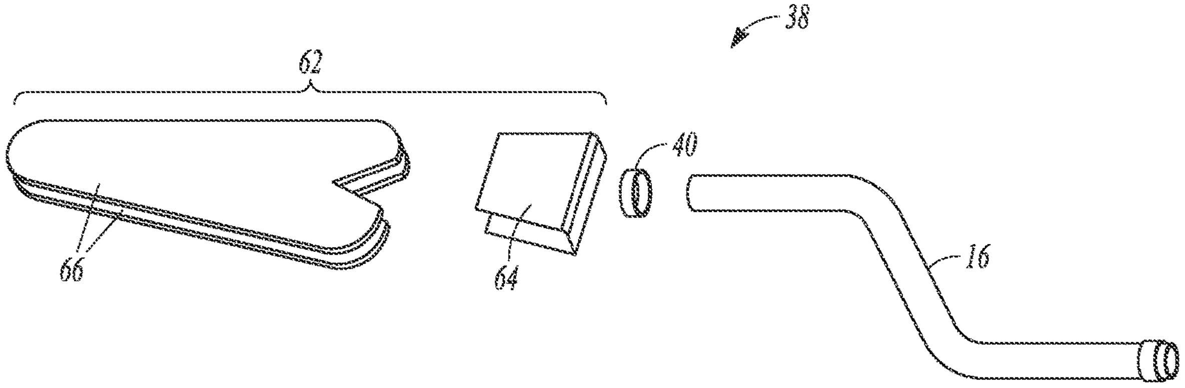
FIG. 7 is an exploded view of the example air distributor assembly of FIG. 6.

FIGS. 6 and 7 show an example of an air distributor 38 and the air delivery hose 16 that can be used with the active layer 20 and resulting air distribution pad 12 of the present disclosure. FIG. 6 shows a perspective view with the air distributor 38 and air delivery hose 16 assembled, while FIG. 7 shows an exploded view of the components of the air distributor 38 and the air delivery hose 16. The air distributor 38 can include a manifold 62 that is connectable to the hose 16. The manifold 62 can receive air from the hose 16 and can be configured to distribute the air to the spacer layer 32. The manifold 62 can be positioned inside the active layer 20, such as within a corresponding cavity in the spacer layer 32.

The manifold 62 can comprise a bracket 64 and a pair of wings 66. The wings 66 can be coupled to the bracket 64 so that the wings 66 are vertically separated for one another, leaving an air gap in the active layer 20 for the air flow to encounter immediately after being delivered to the active layer 20 from the air delivery hose 46. The air gap between the wings 66 can feed the delivered air to the spacer layer 32, such as to the space among the fibers 42 of the spacer material of the spacer layer 32. The wings 66 can have a generally tear-drop shape to provide for air flow into the primary channels 46.

In an example, each of the wings 66 comprise a spacer material similar or identical to the spacer material of the spacer layer 32. The wings 66 can be coupled or otherwise connected to the spacer material 32 to maintain the vertical spacing. The manifold 62 can be enclosed by the upper layer 34 and the lower layer 36 of the active layer 20. As described above, in an example, shown in FIG. 5, the spacer layer 32 can have a first thickness. Each of the wings 66 can comprise a single layer of spacer material having a second thickness that is less than or equal to the first thickness of the spacer layer 32. Air can flow from the hose 16, through the port 40, and into the bracket 64. The air can then flow either between the wings 66, through the spacer material of the wings 66, or both, and then into the spacer layer 32 in order to pass longitudinally along the active layer 20 through the primary channels 46.

Figure 8:
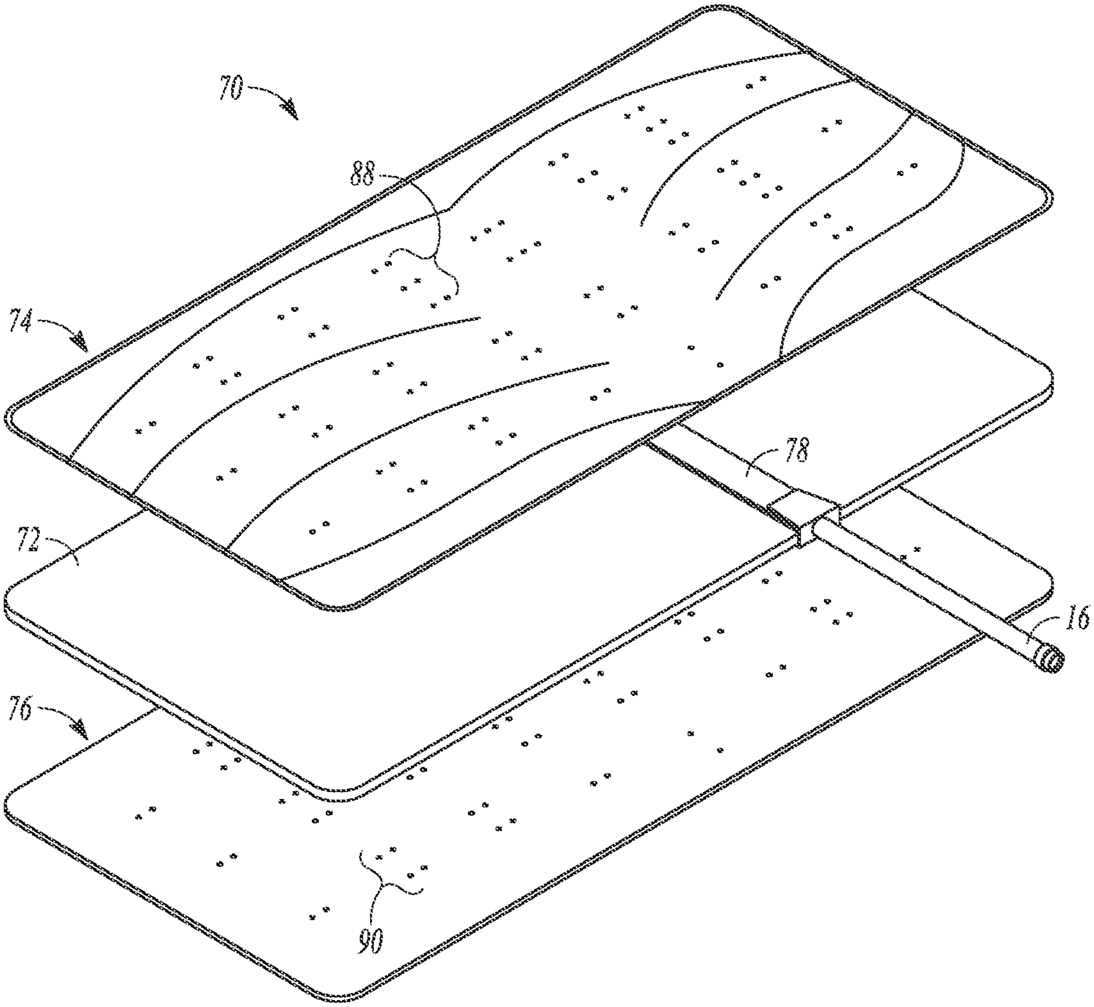
FIG. 8 is an exploded view of another example active layer of an air distribution pad.
Figure 9:
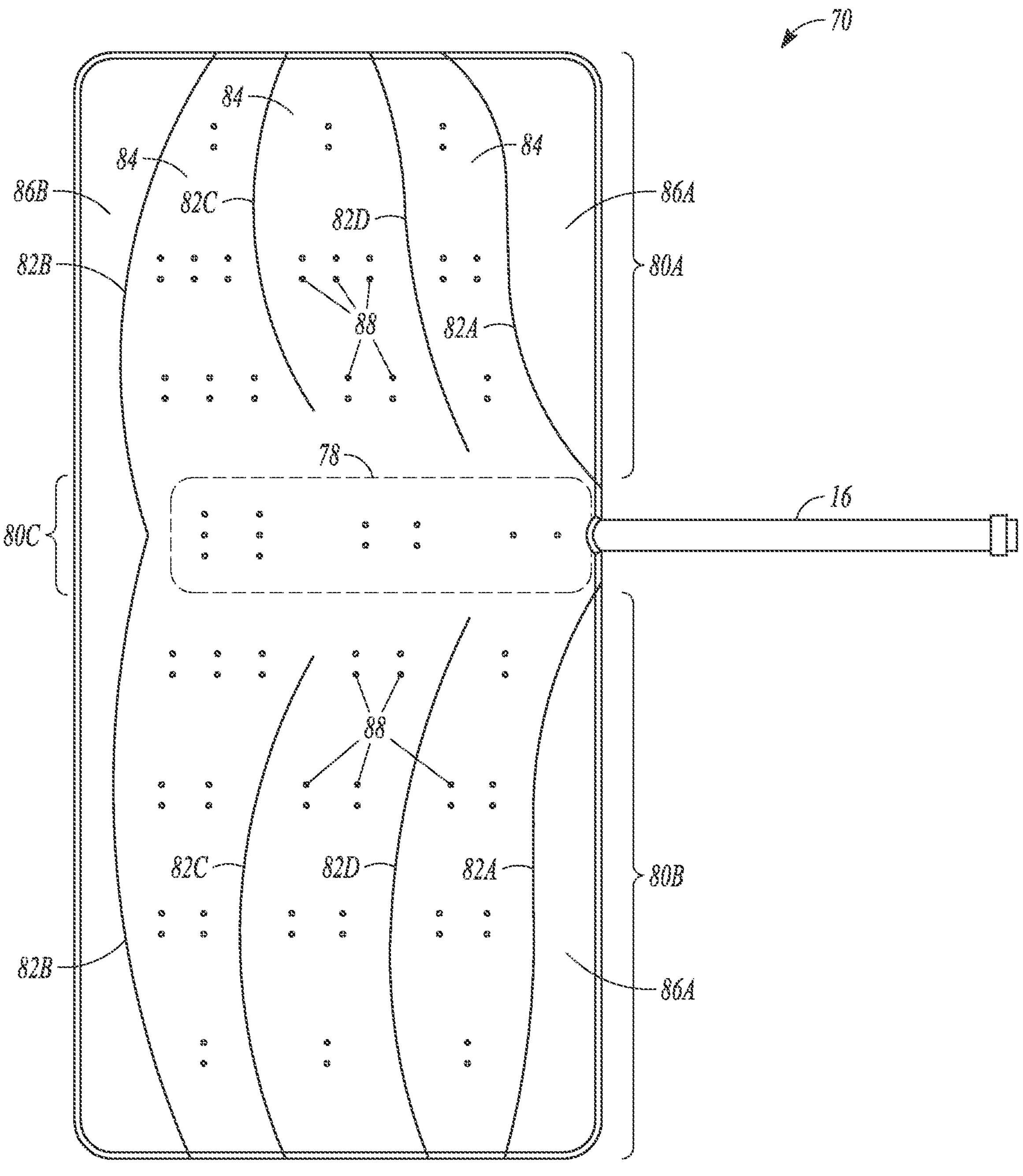
FIG. 9 is a top view of the example active layer from FIG. 8 assembled.

FIGS. 8 and 9 show an example of another active layer 70 that can be used in the air distribution pad 12 of the present disclosure. FIG. 8 shows an exploded view of the active layer 70, while FIG. 9 shows a top view of the assembled active layer 70. The active layer 70 shown in the examples of FIGS. 8 and 9 can be similar to the active layer 20 describe above with respect to FIGS. 3-5. For example, the active layer 70 can include an internal spacer layer 72, similar to the spacer layer 32 of the active layer 20. The spacer layer 72 can be at least partially surrounded or enclosed by an external casing, such as an upper layer 74 and a lower layer 76 that can be joined together, such as by stitching, welding, with a joining structure, and the like. The casing layers 74, 76 can substantially surround and encase the spacer layer 72.

Like the spacer layer 32, the spacer layer 72 of the active layer 70 can comprise a structure that permits air to flow relatively freely through the spacer layer 72, such as a foam or a reticulated engineered material, as described above. The active layer 70 can also comprise an air distributor 78, which can be similar to the air distributor 38 described above, to distribute incoming air from the air delivery hose 16 throughout the spacer layer 72. The casing layers 74, 76 can substantially encase the air distributor 78 as well, and can leave an opening (not shown) for a port that can receive the air delivery hose 16.

As shown in the example of FIGS. 8 and 9, the air distributor 78 can be located generally at the longitudinal middle of the active layer 70, rather than proximate a longitudinal end 56, as in the example of FIGS. 3 and 4. In an example, the air distributor 78 can be located within the active layer 70 so that the air distributor 78 can be located generally at a pivot point of an adjustable bed or at a location of the mattress that is not raised or lower when the bed is adjusted. For example, the active layer 70 can be configured so that a first portion 80A on a first side of the air distributor 78 (e.g., above the air distributor 78 in FIG. 9) so that the first portion 80A can be positioned over a first articulating section of an adjustable bed, such as a torso or head section of the adjustable bed. The active layer 70 can also include a second portion 80B on a second side of the air distributor 78 (e.g., below the air distributor 78 in FIG. 9) that can be positioned over a second articulating section of the adjustable bed, such as a leg or foot section of the adjustable bed. The air distributor 78 can be located within a third portion 80C of the active layer 70, which can be positioned over a non-articulating third section of the adjustable bed, such as over a middle or seat portion of the adjustable bed. Positioning the air distributor 78 over a non-articulating portion of an adjustable bed can be desirable, because the air distributor 78 will not be raised or lowered, which could, in turn, raise and lower a heating or cooling engine connected to the air distributor 78 via the hose 16.

Like the upper layer 34 and the lower layer 36 of the active layer 20, the upper layer 74 and the lower layer 76 of the active layer 70 can be joined together at the periphery of the layers 74, 76, such as with stitching or fabric tape at the periphery. The upper layer 74 and the lower layer 76 can also be joined together with one or more joining structures 82A, 82B, 82C, 82D (collectively referred to herein as "joining structures 82"), such as stitching. The stitching or other joining structures 82 can pass through the spacer layer 72 to join the upper layer 74 and the lower layer 76 together so that the same spacer layer 72 extends throughout substantially the entire active layer 70. The joining structures 82 can provide channels through the active layer 70 that can direct the flow of air received from the engine 14. The one or more joining structures 82 can join the layers 74, 76 together to form at least one primary channel 84 and at least one secondary channel 86A, 86B (collectively referred to herein as "secondary channel(s) 86").

Like the primary channels 46 described above, the primary channels 84 can direct air through the active layer 70 (e.g., through the spacer layer 72) substantially directly from the air distributor 78, e.g., such that the only obstacle to air flow between the air distributor 78 and the primary channels 84 are the fibers or other structures that form the spacer layer 72. In contrast, the secondary channels 86 can be indirectly connected to the air distributor 78, e.g., such that an airflow path from the air distributor 78 to a secondary channel 86 passes through a primary channel 84 and through a joining structure 82, such as stitching.

Like the exemplary primary channels 46 and secondary channels 48 described above, the permeability of air between a primary channel 84 and a secondary channel 86 in the example of FIGS. 8 and 9 can be relatively low, particularly compared to the air permeability through the spacer layer 72 along the primary channels 84, which can allow the air to flow relatively freely. The secondary channels 86 are not, necessarily, completely devoid of air flowing through the channels 86. However, in an example, the secondary channels 86 have no large paths for the ingress into or exit from the secondary channels 86, such that any air flow through a secondary channel 86 can have a substantially smaller flow rate than the air flow through a primary channel 84. A small amount of air can leak through the joining structures 82A and 82B between the primary channels 84 and the secondary channels 86, but this air leak flow can be considerably smaller and more sporadic than the steady and substantially continuous air flow through the primary channels 84.

As shown in the example shown in FIG. 9, the primary channels 84 can include a first set of primary channels 84 located in the first portion 80A on the first side of the air distributor 78 and a second set of primary channels 84 located in the second portion 80B on the second side of the air distributor 78. The air distributor 78 can direct air longitudinally toward the first portion 80A and toward the second portion 80B. Similarly, the secondary channels 86 can include a first set of secondary channels 86 located within the first portion 80A and a second set of secondary channels 86 located within the second portion 80B of the active layer 70. Similar to the primary channels 46 and second channels 48 described above, the primary channels 84 can comprise one or more generally laterally- and centrally-located primary channels 84 with at least one secondary channel 86 on each lateral side of the centrally located primary channels 84. The generally centrally located primary channel 84 can be split into two or more sub-channels. The centrally located primary channel 84 and the secondary channels 86 can be defined by a first joining structure 82A proximate to a side in which air enters the air distributor 78 from the air hose 16, with one first joining structure 82A on each longitudinal side of the air distributor 78. The primary channels 84 and the secondary channels 86 can also be defined by a second joining structure 82B on a lateral side oppose from the side in which air enters the air distributor 78 from the air hose 16. A pair of third joining structures 44C and a pair of fourth joining structures 44D, each having one on either longitudinal side of the air distributor 78, can further split the centrally located primary channel 84 into a middle primary channel with two lateral side primary channels.

As with the joining structures 44 described above, the joining structures 82 can comprise any structure that is capable of reliably joining the upper layer 74 to the lower layer 76, and in particular to any structure that can join the upper layer 74 to the lower layer 76 to provide for reduced air permeability through the spacer layer 72 across the joining structure 82 so that secondary channels 86 can be formed. Like joining structures 44, the joining structures 82 can include one or more of fasteners such as stables, brads, pins, and the like, welding (e.g., for plastic or polymer containing layers 74, 76), adhesives, and stitching.

As with the channels 46, 48, described above, the channels 84, 86 can be configured to redirect the direction of air flow of the air received from the air delivery hose 16, e.g., via the air distributor 78, from a generally lateral direction to a generally longitudinal direction. As shown in FIG. 9, the configuration of the primary channels 84 (e.g., through the placement of the joining structures 82) can be such that the air flow is gradually redirected in a continuous or substantially continuous arc into each primary channel 84.

As shown in FIGS. 8 and 9, the upper layer 74 can include one or more openings 88 that can provide an open path to air flow from the spacer layer 72 out of the active layer 70, e.g., so that the air flow into the user's personal space can be optimized for cooling or heating performance. The openings 88 shown in the example of FIGS. 8 and 9 comprise a plurality of small openings 88 scattered substantially over the entire surface of the upper layer 74, with each opening 88 having a relatively small size, such as a diameter of from about 1 mm to about 10 mm, such as from about 3 mm to about 8 mm, for example about 5 mm. In contrast, the openings 54 shown in FIGS. 3 and 4 can have a relatively large size, such as a diameter of from about 10 mm to about 60 mm, for example from about 20 mm to about 40 mm, such as about 30 mm. The relatively large-sized openings 54 can provide for more concentrated air flow, and thus more concentrated cooling, at the specific locations of the opening 54. The relatively smaller-sized openings 88 can provide for a smaller air flow rate from each opening 88, but can allow for more disperse distribution of air being directed out of the spacer layer 72 while still providing for adequate air flow longitudinally along the spacer layer 72. An active layer can use any combination of relatively-large openings, such as openings 54, and relatively-small openings, such as openings 88, that are desired. The one or more openings 88 can allow for air flowing through the active layer 70 to be distributed over a large area of the personal space of the user, which can provide for one or more of conductive, convective, or evaporative cooling of the user. In addition to the openings 88 in the upper layer 74, the active layer 70 can also include a plurality of openings 90 in the lower layer 76 (FIG. 8).

The use of an active layer 70 with an air distributor 78 located at a middle portion 80C of the active layer 70 with a first set of one or more primary channels 84 on a first longitudinal side of the air distributor 78 and a second set of one or more primary channels 84 on a second longitudinal side of the air distributor 78 can provide for advantages over an active layer 20 with an air distributor 28 proximate a longitudinal end 56 of the active layer 20. For example, the active layer 70 can provide for better thermal performance because the air does not have to travel as far from the air distributor 78 before reaching an end of the primary channels 84. As will be appreciated, cooled air can become heated generally proportionally to the distance that the air travels from the air distributor 78 (and similarly heated air can become cooled generally proportionally to the distance that the air travels from the air distributor 78), so that reducing the distance the air must travel can improve the heating or cooling performance of the air being delivered to the active layer 70. Further, as described above, the active layer 70 can be used with an adjustable bed without the air distributor 78 (and thus the air hose 16 or engine) being raised or lowered by the articulation of sections of the bed. Finally, the use of the active layer 70 with an air distributor 78 located in a longitudinal middle portion, rather than proximate a head end 56 of the active layer 20, can result in a user subjectively feeling that the system is quieter, because the sound-generating source (e.g., the engine 14), is located more remotely from the user's head, and because the air distributor 78 will not be located directly underneath or proximate to a pillow being used by the user.

To better illustrate the present air distribution pad and system of the present disclosure, a non-limiting list of Examples is provided here:

Example 1 can include subject matter (such as an apparatus, a device, a method, or one or more means for performing acts), such as can include an air distribution pad. The subject matter can comprise an upper layer, a lower layer, and a spacer material located between the upper layer and the lower layer, the spacer material configured to allow air to pass therethrough. An air distributor can be configured to distribute air to the spacer material, wherein the air distributor comprises a port configured to receive an air hose, wherein the port is directed laterally sideways from the air distributor. At least one joining structure can be coupled to the upper layer and the lower layer, the at least one joining structure providing one or more channels formed through the spacer material in fluid communication with the air distributor, wherein the one or more channels are configured to direct generally laterally flowing air from the port of the air distributor to a generally longitudinal direction along the at least one channel.

Example 2 can include, or can optionally be combined with the subject matter of Example 1, to optionally include at least one of the upper layer and the lower layer defining one or more openings in communication with the one or more channels.

Example 3 can include, or can optionally be combined with the subject matter of one or any combination of Examples 1 and 2, to optionally include a first joining structure being on a first lateral side of the spacer material proximate the air distributor, and a second joining structure being on a second lateral side of the spacer material opposite the air distributor.

Example 4 can include, or can optionally be combined with the subject matter of one or any combination of Examples 1-4, to optionally include a portion of the first joining structure proximate a first longitudinal end of the spacer material proximate the air distributor forming an acute angle relative to a longitudinal axis of the spacer material.

Example 5 can include, or can optionally be combined with the subject matter of one or any combination of Examples 1-4, to optionally include a portion of the second joining structure proximate the first longitudinal end of the spacer material forming an obtuse angle relative to a lateral axis of the spacer material.

Example 6 can include, or can optionally be combined with the subject matter of one or any combination of Examples 1-5, to optionally include the first joining structure forming a sinusoidal shape along the longitudinal direction.

Example 7 can include, or can optionally be combined with the subject matter of one or any combination of Examples 1-6, to optionally include the second joining structure forming an arc shape along the longitudinal direction.

Example 8 can include, or can optionally be combined with the subject matter of one or any combination of Examples 1-7, to optionally include the at least one joining structure further comprising a third joining structure spaced laterally inward from the first joining structure.

Example 9 can include, or can optionally be combined with the subject matter of one or any combination of Examples 1-8, to optionally include the at least one joining structure comprising a fourth joining structure spaced laterally inward from the second joining structure.

Example 10 can include, or can optionally be combined with the subject matter of one or any combination of Examples 1-9, to optionally include the first joining structure and the third joining structure each forming a sinusoidal shape along the longitudinal direction.

Example 11 can include, or can optionally be combined with the subject matter of one or any combination of Examples 1-10, to optionally include the second joining structure and the fourth joining structure each forming an arc shape along the longitudinal direction.

Example 12 can include, or can optionally be combined with the subject matter of one or any combination of Examples 1-11, to optionally include at least one of the upper layer and the lower layer defining one or more first openings between the first joining structure and the third joining structure.

Example 13 can include, or can optionally be combined with the subject matter of one or any combination of Examples 1-12, to optionally include at least one of the upper layer and the lower layer defining one or more second openings between the second joining structure and the fourth joining structure.

Example 14 can include, or can optionally be combined with the subject matter of one or any combination of Examples 1-13, to optionally include at least one of the upper layer and the lower layer defining one or more third openings between the third joining structure and the fourth joining structure.

Example 15 can include, or can optionally be combined with the subject matter of one or any combination of Examples 1-14, to optionally include the at least one joining structure comprising stitching between the upper layer and the lower layer, the stitching extending through the spacer material.

Example 16 can include, or can optionally be combined with the subject matter of one or any combination of Examples 1-15, to optionally include a configuration of the upper layer being substantially a mirror image of a configuration of the lower layer.

Example 17 can include, or can optionally be combined with the subject matter of one or any combination of Examples 1-16, to optionally include a comfort layer, wherein the combination of the comfort layer and the spacer material provides a cushion-neutral feel for a user.

Example 18 can include, or can optionally be combined with the subject matter of one or any combination of Examples 1-17, to include subject matter (such as an apparatus, a device, a method, or one or more means for performing acts), such as can include an air distribution pad. The subject matter can comprise an upper layer, a lower layer, and a spacer material located between the upper layer and the lower layer, the spacer material configured to allow air to pass therethrough. An air distributor can be configured to distribute air to the spacer material, wherein the air distributor comprises a port configured to receive an air hose. Stitching can couple the upper layer and the lower layer and can extend through the spacer material. The stitching can provide one or more channels formed through the spacer material in fluid communication with the air distributor. At least one of the top layer and the bottom layer can define one or more openings in communication with the one or more channels. The one or more channels can be configured to direct air from the air distributor along the one or more channels and out of the one or more openings.

Example 19 can include, or can optionally be combined with the subject matter of one or any combination of Examples 1-18, to optionally include the port in the air distributor being directed laterally sideways, and the one or more channels are configured to direct generally laterally flowing air from the port to a generally longitudinal direction along the at least one channel.

Example 20 can include, or can optionally be combined with the subject matter of one or any combination of Examples 1-19, to optionally include the stitching comprising a first line of stitching on a first lateral side of the spacer material proximate the air distributor.

Example 21 can include, or can optionally be combined with the subject matter of one or any combination of Examples 1-20, to optionally include the stitching comprising a second line of stitching on a second lateral side of the spacer material opposite the air distributor.

Example 22 can include, or can optionally be combined with the subject matter of one or any combination of Examples 1-21, to optionally include a portion of the first line of stitching proximate a first longitudinal end of the spacer material proximate the air distributor forming an acute angle relative to a longitudinal axis of the spacer material.

Example 23 can include, or can optionally be combined with the subject matter of one or any combination of Examples 1-22, to optionally include a portion of the second line of stitching proximate the first longitudinal end of the spacer material forming an obtuse angle relative to a lateral axis of the spacer material.

Example 24 can include, or can optionally be combined with the subject matter of one or any combination of Examples 1-23, to optionally include the first line of stitching forming a sinusoidal shape along the longitudinal direction.

Example 25 can include, or can optionally be combined with the subject matter of one or any combination of Examples 1-24, to optionally include the second line of stitching forming an arc shape along the longitudinal direction.

Example 26 can include, or can optionally be combined with the subject matter of one or any combination of Examples 1-25, to optionally include the stitching further comprising a third line of stitching spaced laterally inward from the first joining structure Example 27 can include, or can optionally be combined with the subject matter of one or any combination of Examples 1-26, to optionally include the stitching further comprising a fourth line of stitching spaced laterally inward from the second joining structure.

Example 28 can include, or can optionally be combined with the subject matter of one or any combination of Examples 1-27, to optionally include the first line of stitching and the third line of stitching each forming a sinusoidal shape along the longitudinal direction.

Example 29 can include, or can optionally be combined with the subject matter of one or any combination of Examples 1-28, to optionally include the second line of stitching and the fourth line of stitching each forming an arc shape along the longitudinal direction.

Example 30 can include, or can optionally be combined with the subject matter of one or any combination of Examples 1-29, to optionally include at least one of the upper layer and the lower layer defining one or more first openings between the first line of stitching and the third line of stitching.

Example 31 can include, or can optionally be combined with the subject matter of one or any combination of Examples 1-30, to optionally include at least one of the upper layer and the lower layer defining one or more second openings between the second line of stitching and the fourth line of stitching.

Example 32 can include, or can optionally be combined with the subject matter of one or any combination of Examples 1-31, to optionally include at least one of the upper layer and the lower layer defining one or more third openings between the third line of stitching and the fourth line of stitching.

Example 33 can include, or can optionally be combined with the subject matter of one or any combination of Examples 1-32, to optionally include a configuration of the upper layer being substantially a mirror image of a configuration of the lower layer.

Example 34 can include, or can optionally be combined with the subject matter of one or any combination of Examples 1-33, to optionally include a comfort layer, wherein the combination of the comfort layer and the spacer material provides a cushion-neutral feel for a user.

Example 35 can include, or can optionally be combined with the subject matter of one or any combination of Examples 1-34, to include subject matter (such as an apparatus, a device, a method, or one or more means for performing acts), such as can include an air distribution system. The subject matter can comprise an air distribution pad including an upper layer, a lower layer, and a spacer material located between the upper layer and the lower layer, the spacer material configured to allow air to pass therethrough. The air distribution pad can further include an air distributor configured to distribute air to the spacer material, wherein the air distributor comprises a port. The air distribution pad can further include stitching, coupling the upper layer and the lower layer and extending through the spacer material, the stitching providing one or more channels formed through the spacer material in fluid communication with the air distributor. The one or more channels can be configured to direct air from the air distributor along the one or more channels. The system can further include an engine configured to perform at least one of heating air or cooling air and an air deliver hose with a first end coupleable to the engine and a second end coupleable to the port of the air distributor.

Example 36 can include, or can optionally be combined with the subject matter of one or any combination of Examples 1-35, to optionally include the port in the air distributor being directed laterally sideways, and the one or more channels being configured to direct generally laterally flowing air from the port to a generally longitudinal direction along the at least one channel.

Example 37 can include, or can optionally be combined with the subject matter of one or any combination of Examples 1-36, to optionally include at least one of the upper layer and the lower layer defining one or more openings in communication with the one or more channels.

Example 38 can include, or can optionally be combined with the subject matter of one or any combination of Examples 1-37, to optionally include the stitching comprising a first line of stitching on a first lateral side of the spacer material proximate the air distributor.

Example 39 can include, or can optionally be combined with the subject matter of one or any combination of Examples 1-38, to optionally include the stitching comprising a second line of stitching on a second lateral side of the spacer material opposite the air distributor.

Example 40 can include, or can optionally be combined with the subject matter of one or any combination of Examples 1-39, to optionally include a portion of the first line of stitching proximate a first longitudinal end of the spacer material proximate the air distributor forming an acute angle relative to a longitudinal axis of the spacer material.

Example 41 can include, or can optionally be combined with the subject matter of one or any combination of Examples 1-40, to optionally include a portion of the second line of stitching proximate the first longitudinal end of the spacer material forming an obtuse angle relative to a lateral axis of the spacer material.

Example 42 can include, or can optionally be combined with the subject matter of one or any combination of Examples 1-41, to optionally include the first line of stitching forming a sinusoidal shape along the longitudinal direction.

Example 43 can include, or can optionally be combined with the subject matter of one or any combination of Examples 1-42, to optionally include the second line of stitching forming an arc shape along the longitudinal direction.

Example 44 can include, or can optionally be combined with the subject matter of one or any combination of Examples 1-43, to optionally include the stitching further comprising a third line of stitching spaced laterally inward from the first joining structure.

Example 45 can include, or can optionally be combined with the subject matter of one or any combination of Examples 1-44, to optionally include the stitching further comprising a fourth line of stitching spaced laterally inward from the second joining structure.

Example 46 can include, or can optionally be combined with the subject matter of one or any combination of Examples 1-45, to optionally include the first line of stitching and the third line of stitching each forming a sinusoidal shape along the longitudinal direction.

Example 47 can include, or can optionally be combined with the subject matter of one or any combination of Examples 1-46, to optionally include the second line of stitching and the fourth line of stitching each forming an arc shape along the longitudinal direction.

Example 48 can include, or can optionally be combined with the subject matter of one or any combination of Examples 1-47, to optionally include at least one of the upper layer and the lower layer defining one or more first openings between the first line of stitching and the third line of stitching.

Example 49 can include, or can optionally be combined with the subject matter of one or any combination of Examples 1-48, to optionally include at least one of the upper layer and the lower layer defining one or more second openings between the second line of stitching and the fourth line of stitching.

Example 50 can include, or can optionally be combined with the subject matter of one or any combination of Examples 1-49, to optionally include at least one of the upper layer and the lower layer defining one or more third openings between the third line of stitching and the fourth line of stitching.

Example 51 can include, or can optionally be combined with the subject matter of one or any combination of Examples 1-50, to optionally include the engine comprising a thermoelectric heating and cooling device.

Example 52 can include, or can optionally be combined with the subject matter of one or any combination of Examples 1-51, to optionally include a configuration of the upper layer of the air distribution pad being substantially a mirror image of a configuration of the lower layer of the air distribution pad.

Example 53 can include, or can optionally be combined with the subject matter of one or any combination of Examples 1-52, to optionally include the air distribution pad further comprising a comfort layer, wherein the combination of the comfort layer and the spacer material provides a cushion-neutral feel for a user.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. An air distribution pad, comprising:

an upper layer, a lower layer, and a spacer material located between the upper layer and the lower layer, the spacer material having a plurality of resilient support fibers configured to provide support in compression and configured to allow air to pass therethrough;

an air distributor configured to distribute air to the spacer material, wherein the air distributor comprises a port configured to receive an air hose; and at least one joining structure coupled to the upper layer and the lower layer and extending through the spacer material, the at least one joining structure providing one or more channels formed through the spacer material in fluid communication with the air distributor;

wherein the one or more channels are configured to direct flowing air from the port of the air distributor along at least one of the one or more channels, and wherein the at least one joining structure comprises welding that couples the upper layer and the lower layer and extends through the spacer material, the welding configured to pull the upper layer and lower layer at least partially together to at least partially compress the spacer material and providing the one or more channels formed through the spacer material in fluid communication with the air distributor.

2. The air distribution pad according to claim 1, wherein the upper layer defines one or more openings in communication with the one or more channels.

3. The air distribution pad according to claim 1, wherein a first joining structure is on a first lateral side of the spacer material proximate the air distributor, and a second joining structure is on a second lateral side of the spacer material opposite the air distributor.

4. The air distribution pad according to claim 3, wherein the first joining structure forms a sinusoidal shape along a longitudinal direction and the second joining structure forms an arc shape along the longitudinal direction.

5. The air distribution pad according to claim 1, wherein a configuration of the at least one joining structure at the upper layer is substantially a mirror image of a configuration of the at least one joining structure at the lower layer.

6. The air distribution pad according to claim 1, further comprising a comfort layer, wherein the combination of the comfort layer and the spacer material provides a cushion-neutral feel for a user.

7. The air distribution pad according to claim 1, wherein the lower layer comprises an air impermeable material.

8. The air distribution pad according to claim 3, wherein a portion of the first joining structure proximate a first longitudinal end of the spacer material proximate the air distributor forms an acute angle relative to a longitudinal axis of the spacer material and a portion of the second joining structure proximate the first longitudinal end of the spacer material forms an obtuse angle relative to a lateral axis of the spacer material.

9. The air distribution pad according to claim 1, wherein the air distribution pad has a head area near a head of the air distribution pad, a foot area near a foot of the air distribution pad, and a central area between the head area and the foot area, wherein the air distributor is positioned at the central area of the air distribution pad, wherein the welding comprises a first length of welding extending from the central area to the head area and having a first curved shape, wherein the welding comprises a second length of welding extending from the central area to the foot area and having a second curved shape that curves differently than the first curved shape of the first length of welding, and wherein at least part of the central area has no welding between ends of the first length of welding and the second length of welding.

10. An air distribution pad, comprising:

an upper layer, a lower layer, and a spacer material located between the upper layer and the lower layer, the spacer material configured to allow air to pass therethrough;

an air distributor configured to distribute air to the spacer material, wherein the air distributor comprises a port configured to receive an air hose; and welding coupling the upper layer with the lower layer and extending through the spacer material, the welding configured to pull the upper layer and lower layer at least partially together to at least partially compress the spacer material and providing one or more channels between the upper layer and the lower layer, wherein the upper layer defines openings in fluid communication with the one or more channels, wherein the one or more channels are configured to direct air from the air distributor along the one or more channels and out of the openings.

11. The air distribution pad according to claim 10, wherein the port in the air distributor is directed laterally sideways, and the one or more channels are configured to direct generally laterally flowing air from the port to a generally longitudinal direction along the one or more channels.

12. The air distribution pad according to claim 10, wherein the welding comprises a first line of welding on a first lateral side of the spacer material proximate the air distributor, and a second line of welding on a second lateral side of the spacer material opposite the air distributor, wherein a portion of the first line of welding proximate a first longitudinal end of the spacer material proximate the air distributor forms an acute angle relative to a longitudinal axis of the spacer material and a portion of the second line of welding proximate the first longitudinal end of the spacer material forms an obtuse angle relative to a lateral axis of the spacer material.

13. The air distribution pad of claim 10, further comprising means for directing air into an inlet of the air distribution pad.

14. A fluid distribution pad comprising:

an upper layer configured to be positioned nearer a user resting on the fluid distribution pad;

a lower layer configured to be positioned nearer a mattress;

a spacer layer located between the upper layer and the lower layer, the spacer layer configured to at least partially resist compression and to allow fluid to pass therethrough;

an inlet configured to allow fluid from outside the fluid distribution pad to flow into the spacer layer; and one or more fasteners comprising welding between the upper layer and the lower layer that couple the upper layer with the lower layer extending through the spacer layer, the one or more fasteners pulling a portion of the upper layer and a portion of the lower layer, proximal to the one or more fasteners, towards one another through the spacer layer, the one or more fasteners arranged such that a plurality of fluid channels is formed, the fluid channels defined by an inner surface of the upper layer, an inner surface of the lower layer, and the portions of the upper layer and the lower layer proximal to the one or more fasteners, the fluid channels being at least partially supported by the spacer layer.

15. The fluid distribution pad of claim 14, wherein the one or more fasteners pull the portion of the upper layer and the portion of the lower layer, proximal to the one or more fasteners, towards one another sufficiently so that the portions touch one another through the spacer layer.

16. The fluid distribution pad of claim 14, further comprising means for directing air into the inlet of the fluid distribution pad.

17. The fluid distribution pad of claim 14, wherein the upper layer defines one or more openings in fluid communication with the one or more channels.

18. The fluid distribution pad of claim 14, wherein a first portion of the welding forms a sinusoidal shape along a longitudinal direction and a second portion of the welding forms an arc shape along the longitudinal direction.

19. The fluid distribution pad of claim 14, wherein a configuration of the welding at the upper layer is substantially a mirror image of a configuration of the welding at the lower layer.

20. The fluid distribution pad of claim 14, further comprising a comfort layer, wherein the combination of the comfort layer and the spacer provides a cushion-neutral feel for a user.

* * * * *